United States Patent [19]

Easton et al.

[11] Patent Number: 4,872,071

[45] Date of Patent: Oct. 3, 1989

[54] METHOD AND APPARATUS FOR DETECTING ABNORMAL OPERATION OF MOVING STORAGE APPARATUS

[75] Inventors: Malcolm C. Easton, San Jose; Peter B. P. Phipps, Saratoga, both of Calif.

[73] Assignee: International Business Machines Corporation, Armonk, N.Y.

[21] Appl. No.: 143,798

[22] Filed: Jan. 14, 1988

[51] Int. Cl.⁴ .......................... G11B 27/36; G11B 5/02
[52] U.S. Cl. .......................................... 360/31; 360/67
[58] Field of Search ....................... 360/31, 67, 69, 75, 360/103, 109

[56] References Cited

U.S. PATENT DOCUMENTS

| | | | |
|---|---|---|---|
| 3,183,516 | 5/1965 | Sliter | 360/75 |
| 3,456,249 | 7/1969 | Pear | 360/75 |
| 4,146,911 | 3/1979 | Gyi et al. | 360/75 |
| 4,516,162 | 5/1985 | West | 360/31 |

FOREIGN PATENT DOCUMENTS 60103570  6/1988  Japan ................................. 360/103

OTHER PUBLICATIONS

"The Reproduction of Magnetically Recorded Signals", The Bell System Technical Journal, vol. 30, Oct. 1951, pp. 1145–1173, by R. L. Wallace, Jr.

IBM Tech. Discl. Bull., vol. 11, No. 12, May 1969, p. 1650, entitled "Head Flight Height Monitoring", by A. A. Gaudet et al.

IEEE Trans. on Magnetics MAG-17, No. 4, Jul. 1981, pp. 1372–1375, "Effect of Flying Height Variation on Offtrack Data Handling", by F. Morris et al.

Primary Examiner—Vincent P. Canney
Attorney, Agent, or Firm—Otto Schmid, Jr.

[57] ABSTRACT

A method and apparatus for detecting abnormal operation in a magnetic disk file which comprises reading data for each head and each track to obtain a readback signal. The readback signal is read from a predetermined area of each track on a disk that is not normally rewritten during normal operation of the system. The amplitude of the signal read from one track is compared with the amplitude of the signals read from other tracks, and an alarm condition when the comparison indicates a variation which exceeds a predetermined level. Corrective action can be taken in response to the alarm condition prior to an actual failure condition in the magnetic disk file.

12 Claims, 5 Drawing Sheets

METHOD AND APPARATUS FOR DETECTING ABNORMAL OPERATION OF MOVING STORAGE APPARATUS

DESCRIPTION

Background of the Invention

1. Field of the Invention

This invention relates to moving storage apparatus of the type in which the read/write transducer "flies" above the medium surface when the medium is moving at operating speed, and more particularly to a method and apparatus for detecting abnormal operation in the moving storage apparatus.

2. Description of the Prior Art

In high speed data processing systems, magnetic disks have been employed for large storage capacity requirements. Data is read from and written onto the disks by magnetic transducers commonly called magnetic heads which are positioned over the disk during the retrieval and storage of data on tracks of the disks. The requirements for higher data density on magnetic disks have imposed a requirement to read and write more data on narrower tracks located on the disk. The achievement of a higher data density requires increasingly narrow transducing gaps and increasingly less spacing or clearance, commonly called flying height, between the magnetic transducer and the disk recording surface. It becomes increasingly more difficult to maintain this low flying height constant to the degree required to reliably record and read data at the higher data density.

In normal operation of the systems designed to reliably record and read data at the higher data density, a magnetic head slider flies on an air bearing a fraction of a micron away from the disk surface. Should the head develop abnormal flying characteristics, it can damage the head-disk interface and may lead to damage which results in the loss of stored data.

Prior art attempts to address this problem have concentrated on methods and apparatus to measure the flying height of the magnetic heads. However, prior art techniques have been unable to exhibit the accuracy and precision required to meet current design requirements.

This shortcoming has been overcome by commonly assigned copending application Ser. No. 06/897,180, filed Aug. 15, 1986, by B. R. Brown et al entitled "Method and Apparatus for In-Situ Measurement of Head/Recording Medium Clearance". Methods for measuring flying height provide information about the current state of the head. However, it is known that transitory conditions can cause head-disk interactions that ultimately destroy the head-disk interface. With the prior art, monitoring for such interactions can only be done for brief periods of time, since such monitoring requires the head to fly over a special data track and thus makes the storage system unavailable for storage and retrieval of data.

The prior art has not shown a method and apparatus for detecting a history of abnormal head-disk operations during the time that a system was in use for storage and retrieval of data.

SUMMARY OF THE INVENTION

It is therefore the principal object of this invention to provide a method and apparatus for detecting a history of abnormal head-disk operations during the time that a system is in use for storage and retrieval of data.

In accordance with the invention, a method and apparatus for detecting abnormal operation in a magnetic disk storage system comprises reading data from a predetermined area of each track on a disk that is normally not rewritten during operation of the system, to generate a readback signal, comparing the amplitude of the signal read from one track with the amplitude of the signal read from other tracks for each of the tracks on the disk, and setting an alarm condition when the comparison indicates a variation which exceeds a predetermined level whereby some corrective action can be taken in response to the alarm condition prior to an actual failure condition in the magnetic disk storage system.

In a particular embodiment the comparison is made between the amplitude of the signal read from one track and the amplitude of the signal read from the adjacent tracks for each of the tracks on the disk, and the alarm condition is generated when the amplitude of the signal read from a plurality of tracks differs from the amplitude of the signal from the adjacent track by a predetermined amount.

The foregoing and other objects, features and advantages of the invention will be apparent from the following more particular description of a preferred embodiment of the invention as illustrated in the accompanying drawings.

DESCRIPTION OF THE PREFERRED EMBODIMENT

The present invention will be described as applied to a magnetic disk storage apparatus, such as that shown schematically in FIG. 1.

Figure 1:
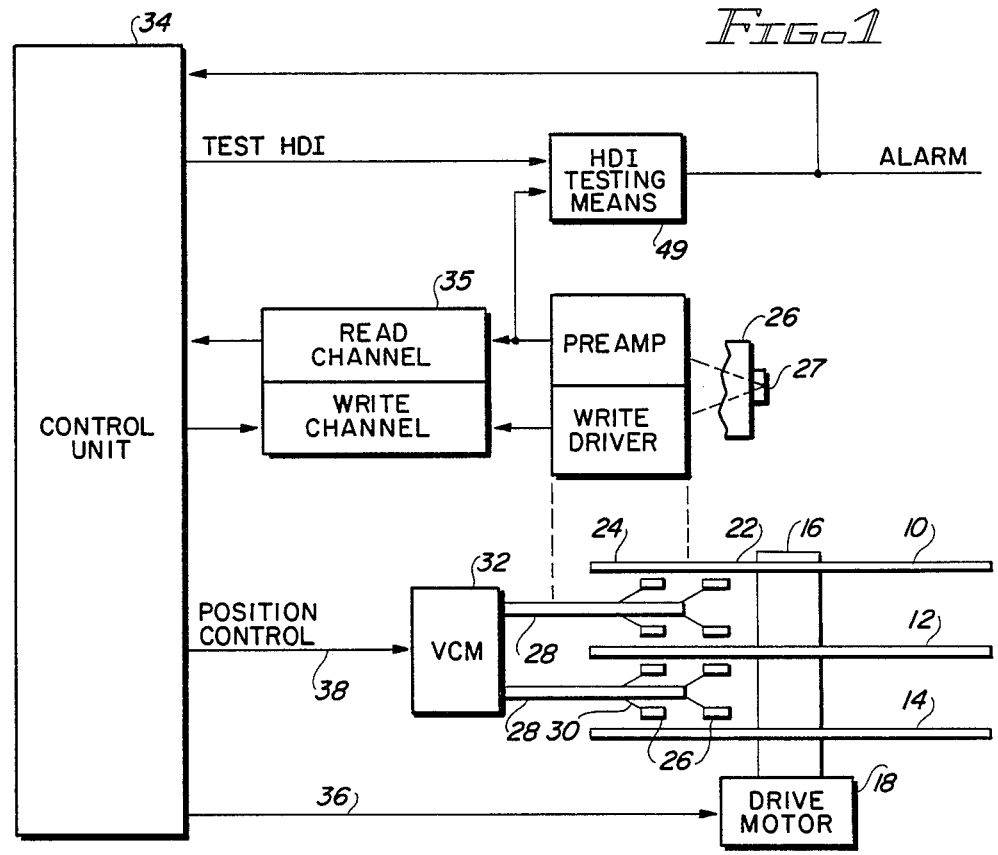
FIG. 1 is a simplified block diagram of a disk file embodying the present invention.

In a conventional magnetic disk file as shown in FIG. 1, a plurality of rigid rotatable disks, such as disks 10, 12 and 14, are supported on a spindle 16 and rotated by a disk drive motor 18. The magnetic recording media on each disk is in the form of an annular pattern of concentric data tracks having an inside data band 22 and an outside data band 24, as shown on disk 10.

As the disks rotate, the sliders are moved radially in and out so that the heads may access different portions of the disk surfaces containing the data. Each slider 26 supports one or more read/write heads and is attached to an actuator arm 28 by means of a suspension 30. The suspensions 30 provide a slight spring force which biases the sliders against the disk surfaces. Each actuator arm 28 is attached to a voice coil motor (VCM) 32. The VCM is a coil movable within a fixed magnetic field, and the direction and velocity of the coil movement is controlled by the current supplied.

During operation of the disk file, the rotation of the disks generates an air bearing between the sliders and disk surfaces. This air bearing thus counterbalances the slight spring force of the suspensions and supports the slider off the disk surfaces during operation.

The above description of a typical disk file, and the accompanying illustration of it in FIG. 1, are for representative purposes only. It should be apparent that disk files may contain a large number of disks and VCMs and that each VCM may support a number of sliders. The present invention of a method and apparatus for detecting abnormal operation in a magnetic disk storage system is fully applicable to any such movable storage apparatus, provided it is of the type in which the sliders "fly" above the storage medium when at operating speed.

The various components of the disk file are controlled in operation by signals generated by control unit 34 which includes internal clock signals, logic control circuits, storage and a microprocessor. The control unit 34 generates control signals to control various disk file operations such as motor control signals on line 36 and position control signals on line 38. The control signals on line 38 provide the desired current profile to optimally move the selected slider 26 to the desired track on the associated disk.

Figure 2:
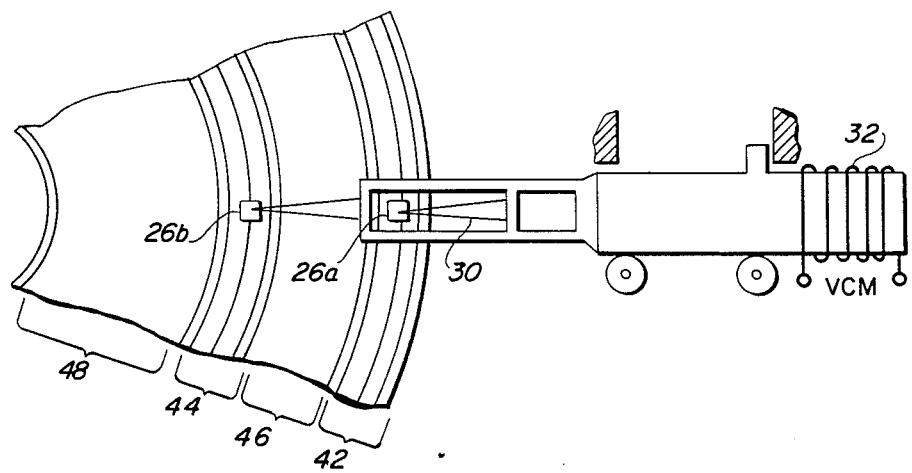
FIG. 2 is a diagram showing the accessing mechanism for a single disk surface of the apparatus of FIG. 1.

As shown in FIG. 2, the sliders 26a and 26b are positioned so that they are initially at one or more tracks 22 and 44 which constitute landing zones or a plurality of data tracks 46 and 48. In accordance with the present invention, a signal is read from a predetermined area of a selected track on the disk to obtain a readback signal. Preferably the predetermined area is one which is normally not rewritten during operation of the system, as will be described in greater detail below. The amplitude of the readback signal for each of the tracks across the recording medium is then compared When the amplitude of the data for adjacent tracks varies by an amount greater than a selected value, an alarm condition is set.

Figure 3:
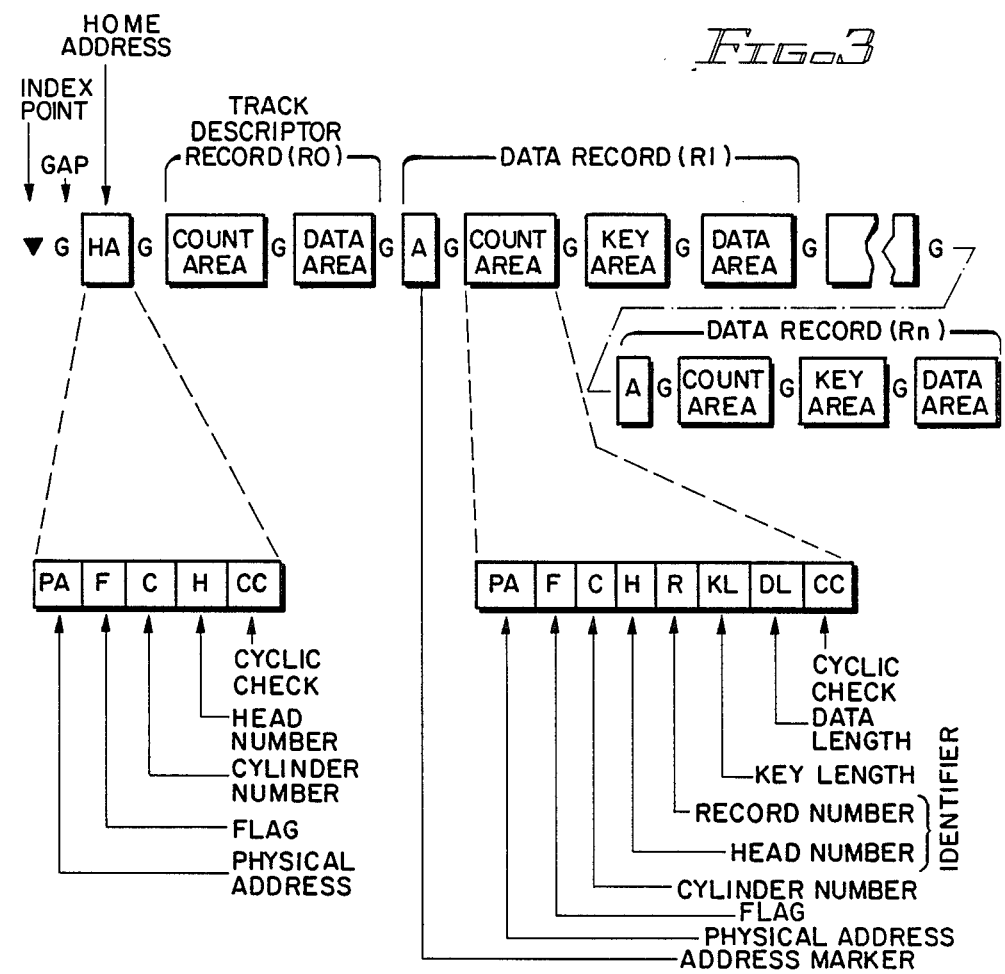
FIG. 3 is a diagram showing the data format for each track on the magnetic disk according to a specific embodiment of the present invention.

The format of the data on a track recorded in the well known count-key-data format is shown in FIG. 3. In this case an index point indicates the physical beginning of the track and this index point is separated from the Home Address (HA) field by a gap. The HA field defines the physical location of the track and the condition of the track. The first record after the HA is the Track Descriptor Record (RO) in which information about the track is stored. One or more Data Records ($R_1$-$R_n$) follow RO on the track. When using the well-known IBM Operating System, neither the HA field nor the RO field is rewritten during normal operation of the system, so the HA and RO fields are read in a specific embodiment of the present invention. The present invention can also be applied to other data formats such as fixed-block architecture and to other non-rewritten areas such as block ID, gap fields, servo information etc. These formats are described in greater detail in the publication "Introduction to IBM Direct Access Storage Devices" by Marilyn Bohl which is published by Science Research Associates, Inc.

According to the present invention, a method and apparatus is provided for detecting the operational characteristics of all the magnetic heads in an operational magnetic disk storage system. The use of the method is invoked by the signal TEST HDI which is generated by control unit 34 (FIG. 1). In accordance with the method, the readback signal is also coupled to a HDI Testing Means 49 under control of the TEST HDI signal from control unit 34. The theoretical basis for the method is that the permanent moment on the recording medium surface provides the readback signal. If the magnetic medium is stressed, the demagnetizing field can reduce the stored energy by switching domains which reduce the remanent magnetization. Thus regions of the medium which have been subject to impact by the head may have their remanent field reduced and this will be seen as a reduced readback signal. Removal of a part of the magnetic disk coating reduces the moment even more.

These factors provide the basis for the wear assessment methods, which take as input the readback signal data and provide an output which indicates whether the head-disk interface is "normal" or "abnormal". Should the system show abnormal wear, an alarm signal is generated. An alarm signal can also be generated in response to track offset problems which generate uncertainties in the amplitude of the readback signal from track to track. A chosen corrective action can be taken in response to the alarm signal prior to an actual failure condition in the magnetic disk storage system. This corrective action may be to shut down the disk file, to notify the customer engineer, to copy the data to another location, or other appropriate action.

The method of the present invention is based on reading regions of the track which are not normally rewritten such as the HA field for example. This reading is repeated for each track for each data surface of the magnetic disks. Reduction in amplitude on one track relative to that on neighboring tracks indicates disk wear or loss of magnetization. From the pattern of amplitude vs. radius, information about past head-disk interaction can be determined.

The steps required in performing the method comprise a seek to track zero, enabling the read of head zero, reading the average amplitude of the HA field, and storing the amplitude for subsequent analysis. The process is continued by a seek to the next track and continue through all tracks and all heads. Alternatively, the data can be collected for all heads in a cylinder, seek to the next cylinder and continued in this manner through all heads and all tracks. The stored data can then be analyzed in a variety of ways to detect a number of specific abnormal operations which will be described in greater detail below.

Figure 4:
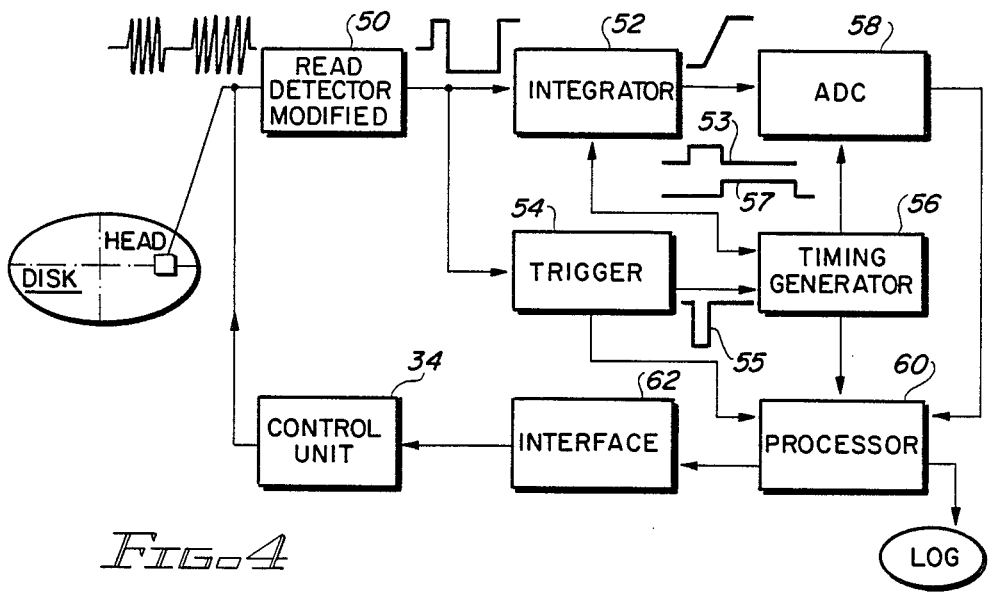
FIG. 4 is a block diagram of the apparatus for detecting abnormal operation in the magnetic disk storage system of FIG. 1 according to a specific embodiment of the present invention.

A block diagram of the apparatus for a specific embodiment for carrying out the invention is shown in FIG. 4. A modified read detector 50 provides the envelope of the readback signal which is taken prior t the automatic gain control circuit which is in read channel 35 (FIG. 1). The envelope signal is coupled to both an integrator circuit 52 and a trigger circuit 54. Trigger circuit 54 generates a trigger signal 55 which is coupled to a timing generator 56. The timing generator 56 generates timing signals which coordinate the operation of the integrator 52, the analog to digital converter (ADC) 58 and the processor 60. The timing generator 56 generates a gating signal 53 which is coupled to the integrator 52 to control how long the integration of the readback signal envelope continues. This value is converted to digital form in ADC 58 under control of the timing signal 57 and stored under control of processor 60. The microprocessor present in the control unit 34 could be used for processor 60 or alternatively, a dedicated microprocessor such as an IBM PC could also be used. In this case commands are sent from processor 60 through a special interface 62, for example, to the control unit 34.

Figure 5:
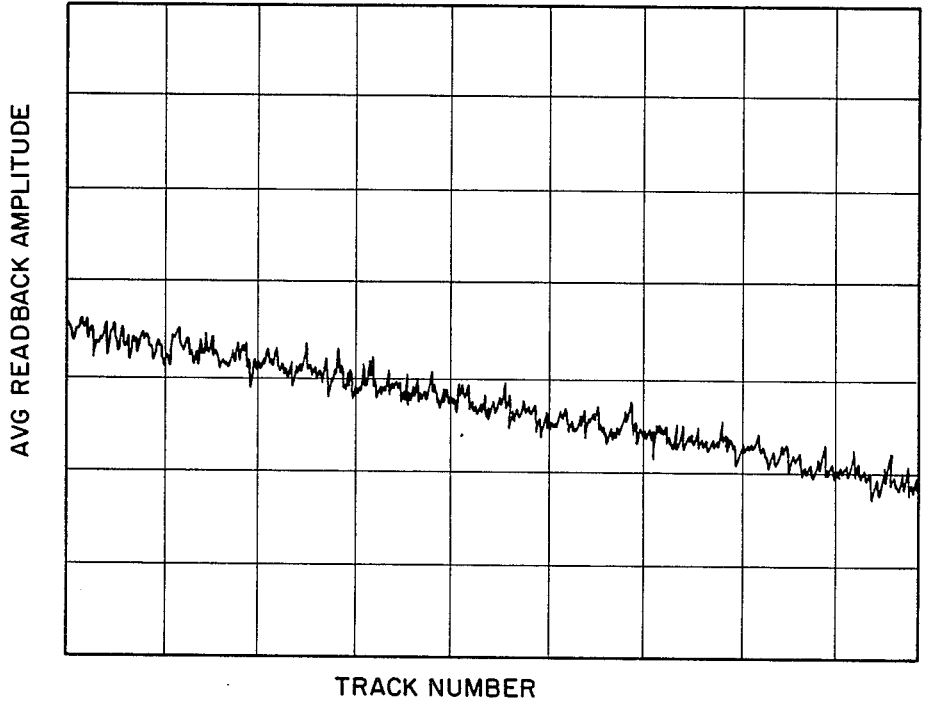
FIG. 5 is a plot of the readback signal amplitude vs. track number which shows normal operation.

Once the data for all tracks and all heads is stored, this data can be processed in a variety of ways to check for different abnormal conditions which can affect the overall system operation. The data can also be plotted in a form such as that shown in FIG. 5 in which the amplitude of the readback signal for adjacent tracks is plotted in sequence. This is a normal plot, and it can be seen that the amplitudes have a definite slope due to the difference in flying height of heads at the inner diameter and the outer diameter of the magnetic disk, the difference in the rate of change of magnetic flux at different diameters, and other factors. The "normal" slope is determined by statistics obtained from a sample of newly built storage devices.

Figure 6:
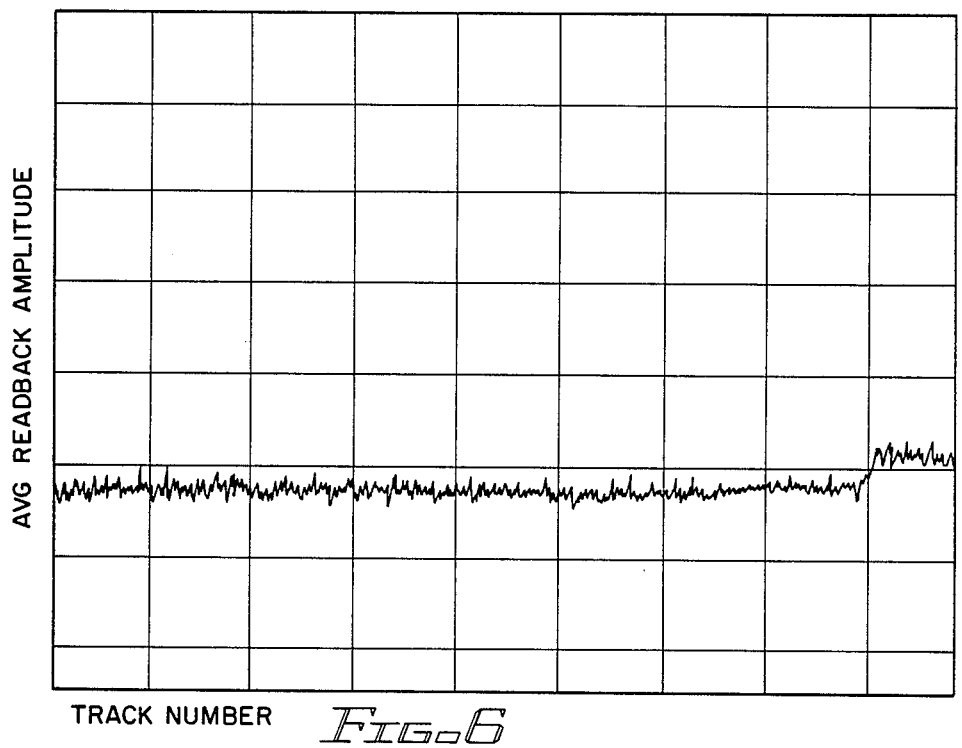
FIG. 6 is a plot of the readback signal amplitude vs. track number which shows abnormal operation in the form of an improper slope.

A plot of data which shows an "abnormal" slope is shown in FIG. 6. The best fitting linear relationship between the readback signal amplitude and radius is computed, and the slope of this line is determined. If the slope is out of the normal range then the head-disk interface is diagnosed as "abnormal". In the plot shown in FIG. 6, the slope is unusually small, and this is caused by one or more of the factors stated above.

Figure 7:
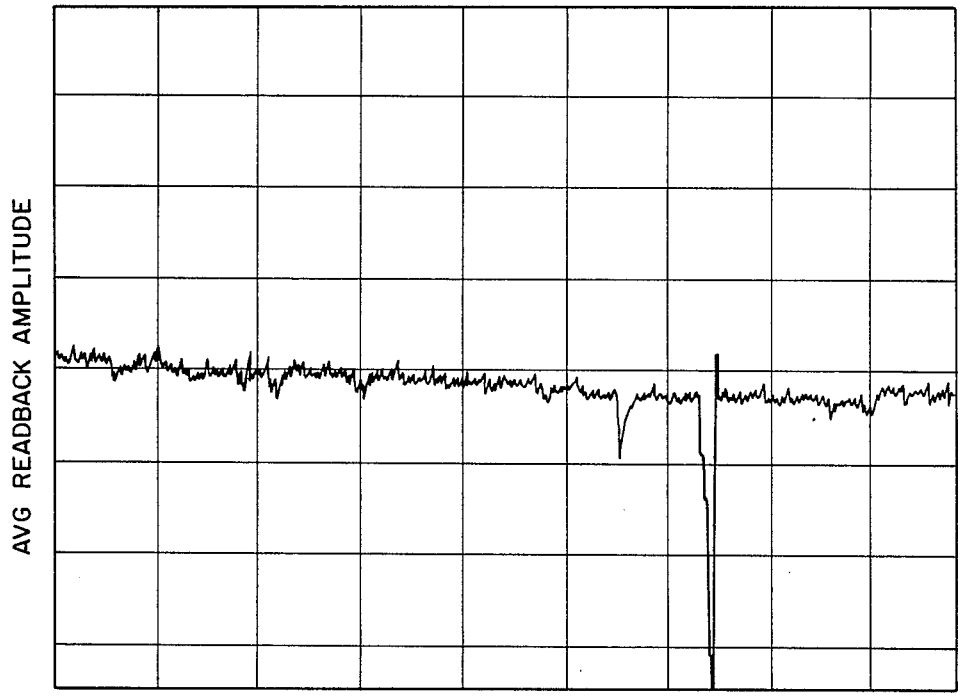
FIG. 7 is a plot of the readback signal amplitude vs. track number which shows a second mode of abnormal operation in which low signal amplitudes are present for some tracks.

A further plot is shown in FIG. 7. To process this plot, the best quadratic fit to the signal amplitude vs. radius plot is computed. This is a simple way of smoothing the data, and other ways may also be used. Individual values are compared to the smoothed data, and, if measured values on K successive tracks (where K may be chosen in the range of 2–20, for example) deviate significantly (15%, for example) in amplitude from the smoothed values, then the head-disk interface is diagnosed as "abnormal". The possible causes of this condition are loss of signal due to non-uniform action of magnetostriction and/or wearing away of magnetic material from the disk surface.

Figure 8:
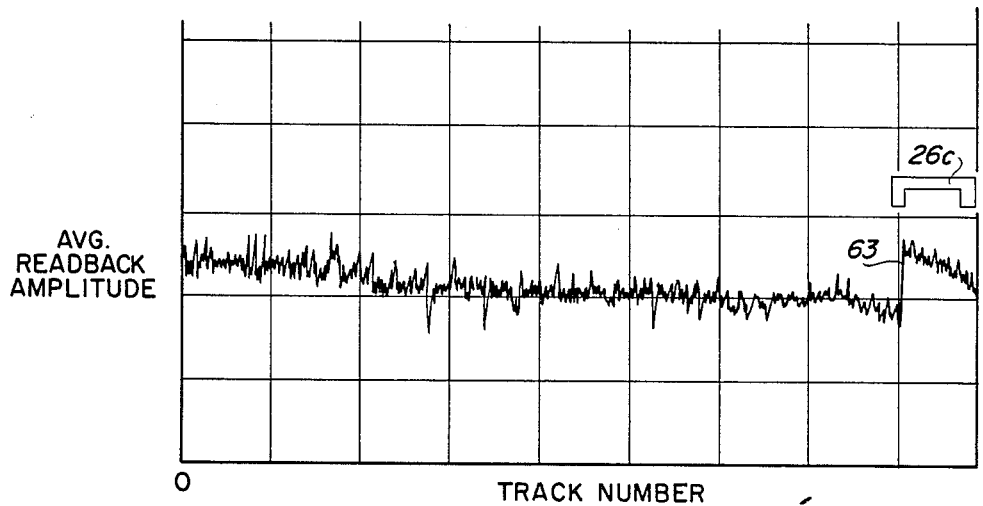
FIG. 8 is a plot of the readback signal amplitude vs track position which shows a step in amplitude.

The method illustrated in FIG. 8 makes use of the dimensions and shape of the slider 26 and the fact that the magnetic read element is attached to one rail and is thus at the edge of the slider. Because of these properties, there is a portion of the surface over which only one rail ever flies since the other rail is prevented by the accessing mechanism from flying over that portion of the surface. In the data processing, the average signal amplitude on N tracks that are flown over by a single rail of the slider are divided by the average signal amplitude on N nearby tracks that are flown over by both rails. The ratio thus obtained is compared with statistics for the same ratio obtained from newly built storage devices. If the ratio is out of normal range then the head-disk interface is declared to be abnormal. An unusually high ratio indicates reduction in signal amplitude caused by interaction with the second rail. In the plot shown in Fig. 8, some abnormal operation is indicated by the "step" 63.

Figure 9:
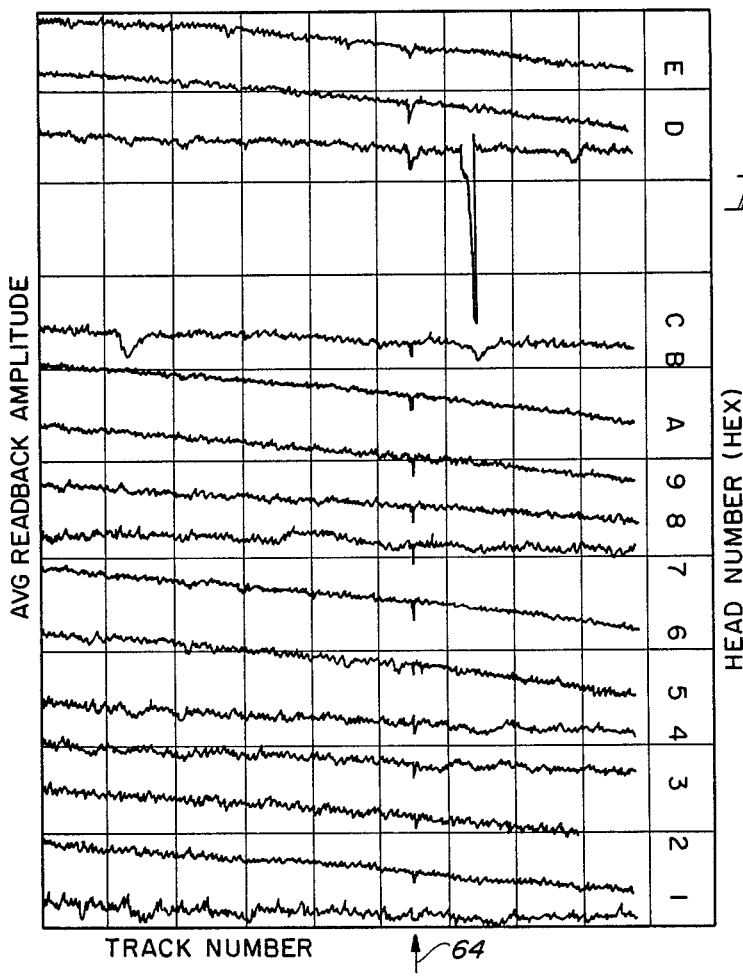
FIG. 9 is a plot of the readback signal amplitude vs. track position for a plurality of heads which shows abnormal operation on a common data cylinder.

A further method is illustrated in FIG. 9, and this method is concerned with comparisons of the data from the entire set of heads while the actuator is at a single position. If a reduced signal amplitude is found on all or many of the heads at the same position, then this indicates a problem with the servo head's data at that position. This condition can be observed on the common cylinder noted by arrow 64 in FIG. 9 which shows a reduced amplitude in the signal from all heads at this track.

Figure 10:
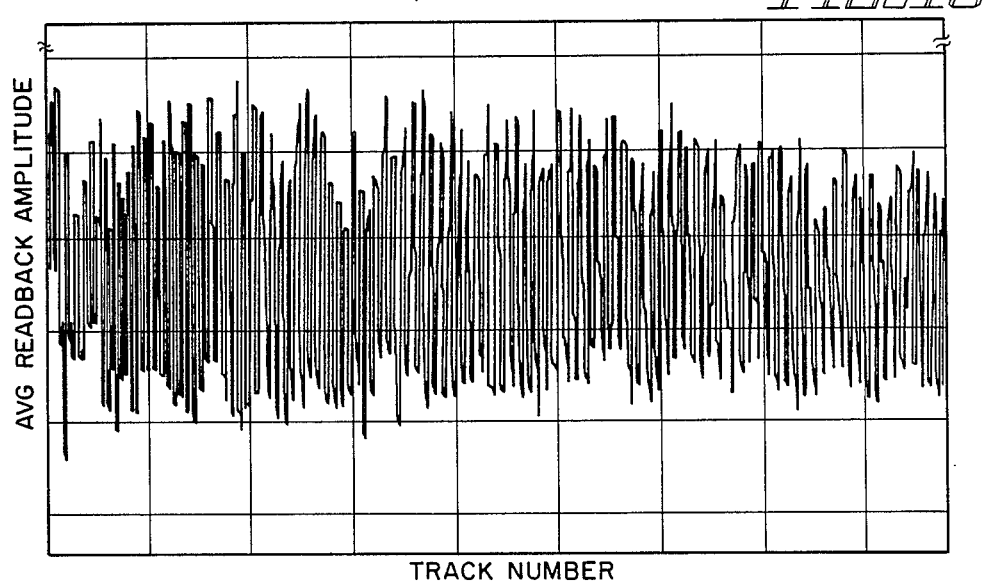
FIG. 10 is a plot of readback signal amplitude vs. track position which shows abnormal operation exhibited by excess variation in amplitude.

The method illustrated in the plot of FIG. 10 is concerned with variations in the measured data under one head. The sequence of data values is obtained in order from the outside diameter track to the inside diameter track. The sequence of values is smoothed using standard methods. Then the deviation of the sequence from the smoothed value is obtained, for example by summing the squares of the differences between actual and smoothed values. If the magnitude of this sum is out of the range for normal data, then this indicates a track offset problem. This provides a method for detecting track offset that is faster than conventional techniques and utilizes simpler apparatus to implement the method. The plot that is shown in FIG. 10 illustrates excessive variation in the resulting values.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new, and desire to secure by Letters Patent is:

1. A method for detecting abnormal operation in a magnetic disk storage system comprising the steps of:
    reading data from a predetermined area of each track on a disk that is normally not rewritten during operation of the system to obtain a readback signal;
    comparing the amplitude of the readback signal read from one track with the amplitude of the readback signal a read from a plurality of other tracks for each of said tracks on the disk; and
    setting an alarm condition when the comparison indicates a variation which exceeds a predetermined level whereby some corrective action can be taken in response to said alarm condition prior to an actual failure condition in said magnetic disk storage system.

2. The method according to claim 1 wherein said comparing step compares data from a plurality of adjacent tracks.

3. The method according to claim 2 wherein said alarm condition is set when the signals read from K successive tracks deviate in amplitude from the adjacent values by a predetermined amount.

4. The method according to claim 3 wherein K is a number within the range of 2 to 20.

5. The method according to claim 1 wherein the signals compared in said comparing step are from the same track number and from a plurality of heads.

6. The method according to claim 1 wherein said comparing step comprises comparing the readback signal read from a plurality of tracks with the amplitude of the readback signal from a plurality of other tracks.

7. The method according to claim 6 wherein the signals compared in said comparing step are from a plurality of neighboring tracks.

8. A method for detecting abnormal operation in a magnetic disk storage system comprising the steps of:

reading data from a predetermined area of each track on a disk that is normally not rewritten during operation of the system to obtain a readback signal;

storing the amplitude of said readback signal for a selected number of the tracks in said system;

processing said amplitude of said readback signals to obtain smoothed data;

comparing the amplitudes of the readback signal from one track with the smoothed data from a plurality of selected tracks; and setting an alarm condition when the comparison indicates a variation which exceeds a predetermined level whereby some corrective action can be taken in response to said alarm condition prior to an actual failure condition in said magnetic disk storage system.

9. The method according to claim 8 wherein said processing step comprises computing the best quadratic fit to the readback signal amplitude versus track number relationship.

10. A method for detecting abnormal operation in a magnetic disk storage system comprising the steps of:

reading data from a predetermined area of each track on a disk that is normally not rewritten during operation of the system to obtain a readback signal;

storing the amplitude of said readback signal for a selected plurality of the tracks in said system;

processing said amplitude of said readback signals to obtain processed amplitudes;

processing said amplitudes and said processed amplitudes to obtain a summary value; and;

setting an alarm condition when said summary value exceeds a predetermined level whereby some corrective action can be taken in response to said alarm condition prior to an actual failure condition in said magnetic disk storage system.

11. The method according to claim 10 wherein said first processing step comprises developing the best linear fit to the readback signal amplitude versus track number relationship, and said second processing step comprises setting the summary value to be equal to the best linear fit.

12. The method according to claim 10 wherein said first processing step comprises smoothing the readback signal amplitude versus track number relationship, and said second processing step comprises setting the summary value to be equal to the sum of the differences between the signal amplitude on a track and the smoothed signal amplitude on the track, where the sum is carried out over selected tracks.

* * * * *

UNITED STATES PATENT AND TRADEMARK OFFICE
CERTIFICATE OF CORRECTION

PATENT NO. : 4,872,071
DATED : October 3, 1989
INVENTOR(S) : M. C. Easton et al

It is certified that error appears in the above-identified patent and that said Letters Patent is hereby corrected as shown below:

On the title page inventors should read:

--(75) Inventors: Malcolm C. Easton, San Jose;

Percy T. Li, Morgan Hill;

Peter B. P. Phipps. Saratoga, all of California. --.

Column 3, line 41, "22" should read --42--.

Column 6, line 42, after "signal" delete "a".

Signed and Sealed this

Twentieth Day of November, 1990

Attest:

HARRY F. MANBECK, JR.

*Attesting Officer*   *Commissioner of Patents and Trademarks*